(12) United States Patent
Carroll

(10) Patent No.: US 8,820,958 B2
(45) Date of Patent: Sep. 2, 2014

(54) LAMP DEVICES

(76) Inventor: Min Carroll, Montgomery, IL (US)

(*) Notice: Subject to any disclaimer, the term of this patent is extended or adjusted under 35 U.S.C. 154(b) by 205 days.

(21) Appl. No.: 13/437,865

(22) Filed: Apr. 2, 2012

(65) Prior Publication Data

US 2012/0250298 A1    Oct. 4, 2012

(51) Int. Cl.
| | |
|---|---|
| *F21L 4/02* | (2006.01) |
| *F21S 9/03* | (2006.01) |
| *F21V 19/04* | (2006.01) |
| *F21V 15/01* | (2006.01) |
| *F21W 121/00* | (2006.01) |
| *F21Y 101/02* | (2006.01) |

(52) U.S. Cl.
CPC ............ *F21S 9/037* (2013.01); *F21W 2121/00* (2013.01); *F21Y 2101/02* (2013.01); *F21V 19/04* (2013.01); *F21V 15/01* (2013.01)
USPC ........... 362/184; 362/190; 362/223; 362/225; 362/249.02; 362/555

(58) Field of Classification Search
USPC ............ 362/183, 184, 190, 217.01, 223, 225, 362/249.01, 249.02, 551, 555
See application file for complete search history.

(56) References Cited

U.S. PATENT DOCUMENTS 7,053,539 B2    5/2006  Shimonaka
2007/0291473 A1*  12/2007  Traynor ........................ 362/106

* cited by examiner

Primary Examiner — Meghan Dunwiddie

(57) ABSTRACT

The exemplary lamp devices have polygon lamp devices, polygon-round lamp devices and round lamp devices which can be used indoor and outdoor for illumination of a surrounding area.

8 Claims, 11 Drawing Sheets

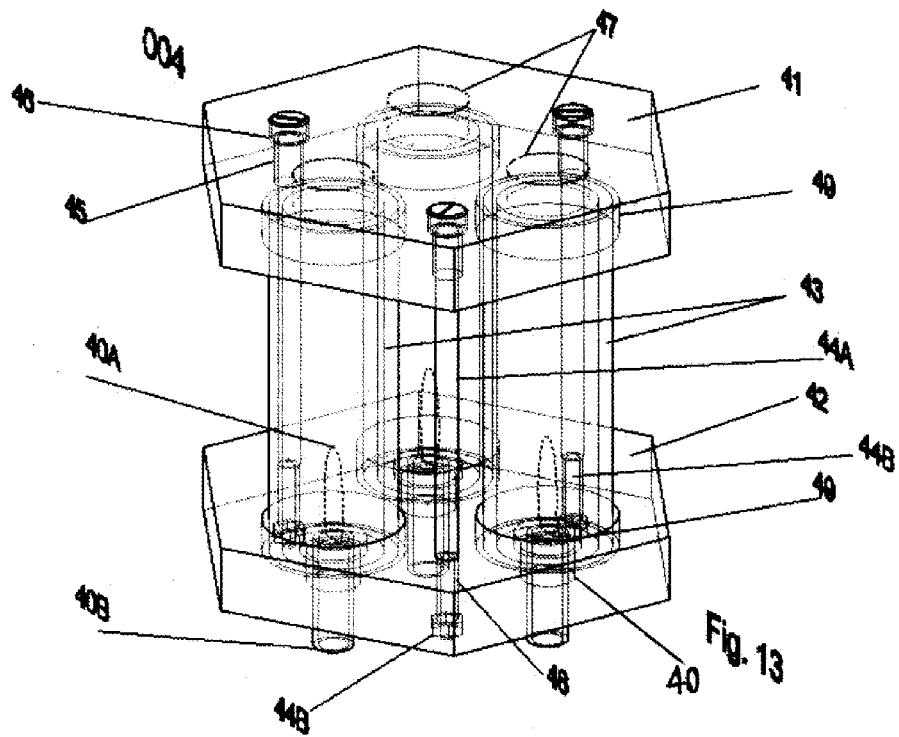
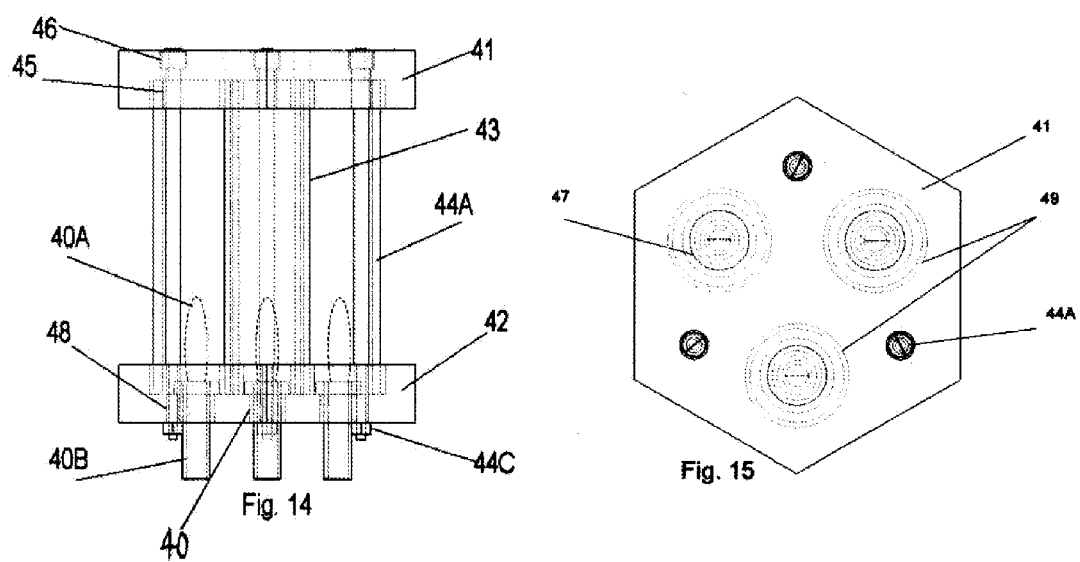

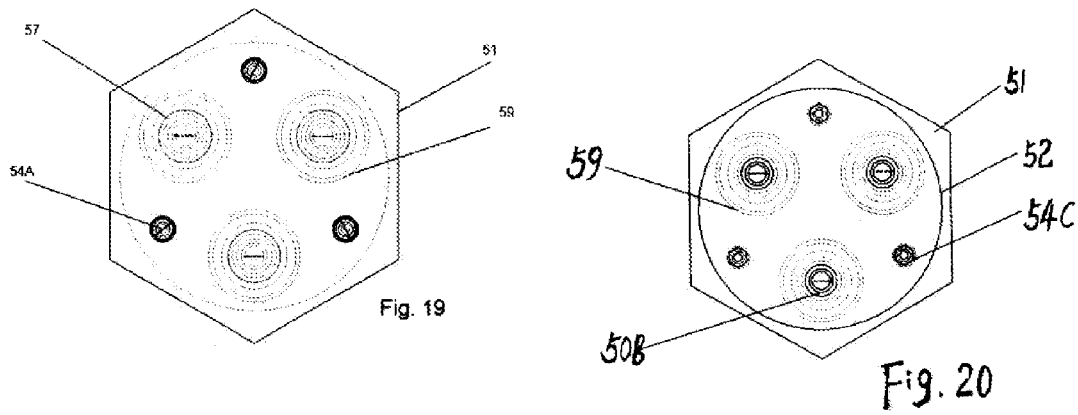
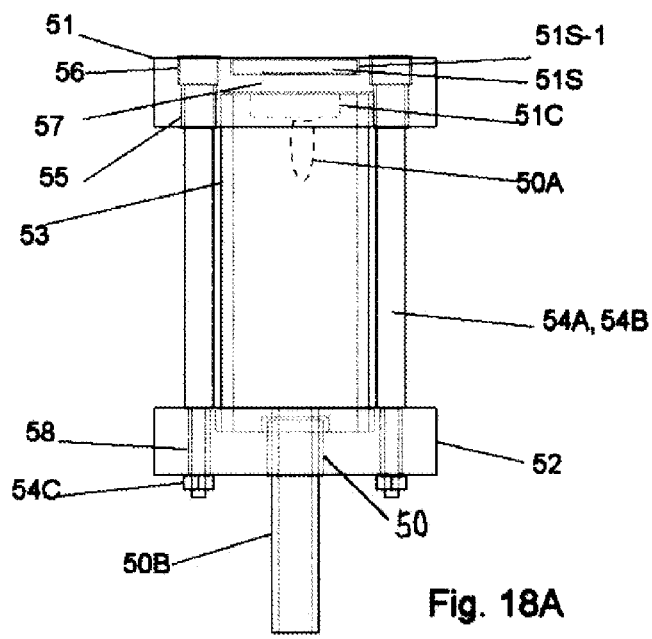

LAMP DEVICES

BACKGROUND OF THE INVENTION

This invention relates to improvement of the appearances of the area for outdoor and indoor applications, specifically the invention is designed to create a decorative environment by using various lamp devices for lighting or illumination.

Current lamp type devices whether traditional or solar powered are not multi functional to satisfy the wide variety needs. Furthermore these lamps require a great deal of production processing and assembling procedures. The current invention of the lamp devices not only solves these problems but is also suitable for family and business use, or indoor and outdoor applications such as office or residential housing, public street lighting, park or forest preserve lighting, backyard path lighting, deck, wall or drive way illumination and also the lamp devices can be combined with additional structures.

BRIEF DESCRIPTION OF THE DRAWINGS

FIG. 13 illustrates a trimetric view for the exemplary polygon lamp device 004.

FIG. 14 illustrates a front perspective view for the polygon lamp of FIG. 13.

FIG. 15 illustrates a top perspective view of FIG. 13.

FIG. 19 illustrates a top perspective view of FIG. 17.

FIG. 20 illustrates a bottom perspective view of FIG. 17.

FIG. 18A illustrates a front perspective view of FIG. 17A.

DETAILED DESCRIPTION OF DRAWINGS

Figure 1:
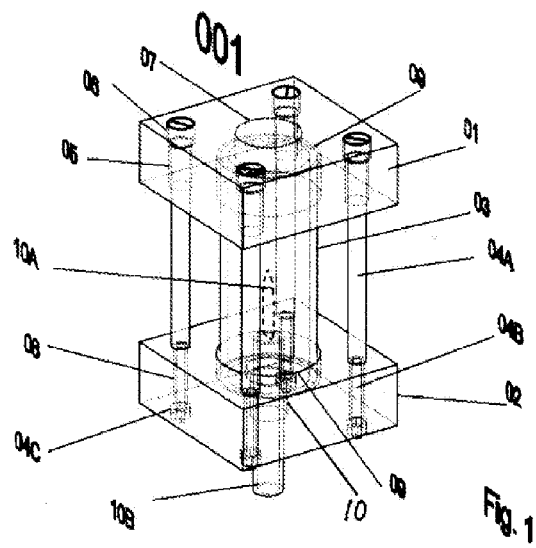
FIG. 1 illustrates a trimetric view for an exemplary polygon lamp device 001.
Figure 2:
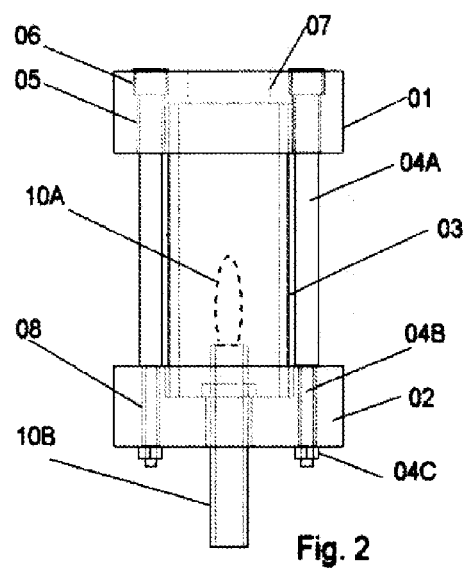
FIG. 2 illustrates a front perspective view for the polygon lamp device of FIG. 1.
Figure 3:
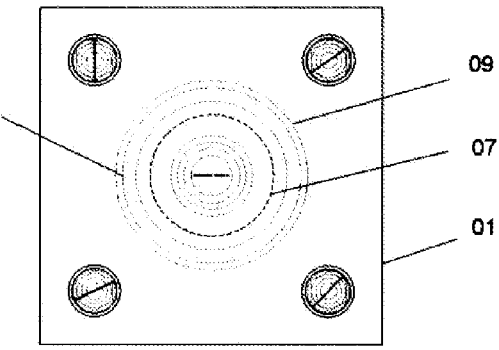
FIG. 3 illustrates a top perspective view of the FIG. 1.
Figure 1A:
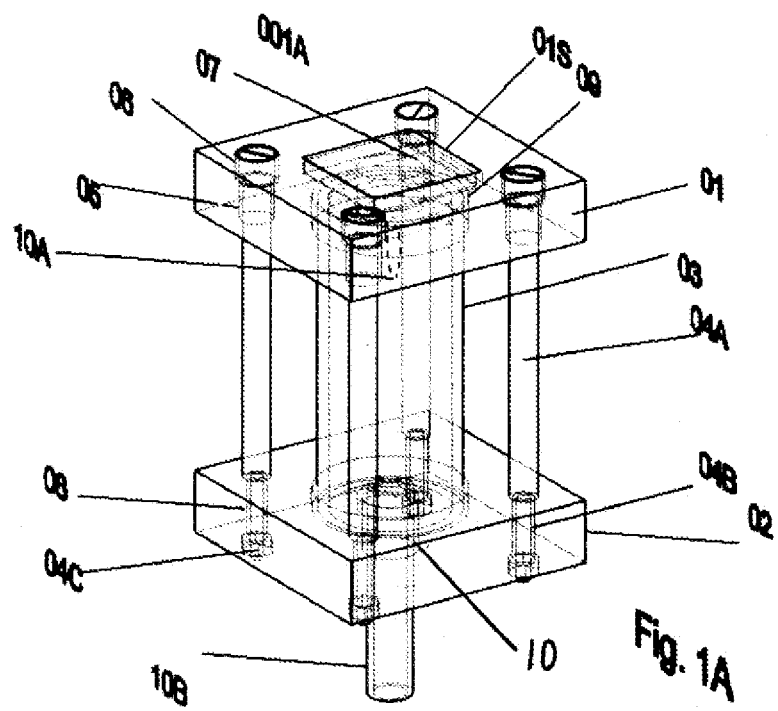
FIG. 1A illustrates a trimetric view for an exemplary polygon lamp device 001A including a solar penal and a lighting control system in addition to polygon lamp device 001.
Figure 6:
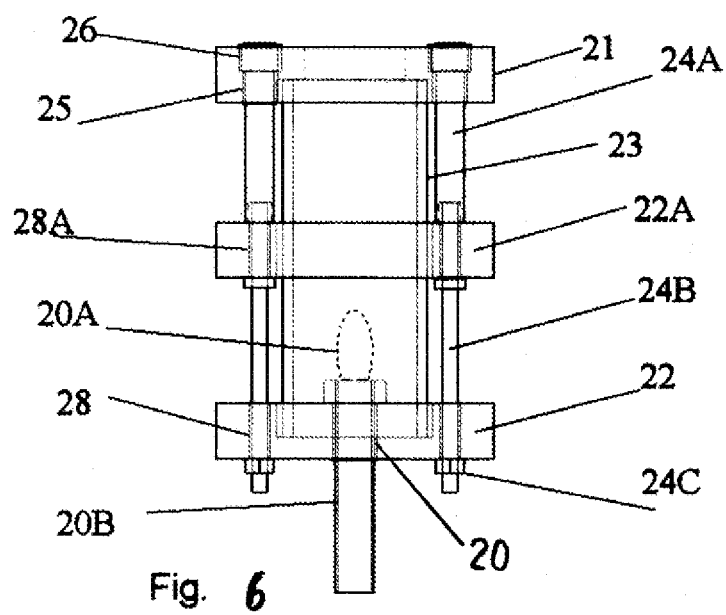
FIG. 6 illustrates a front perspective view for the polygon lamp device of FIG. 5.
Figure 4:
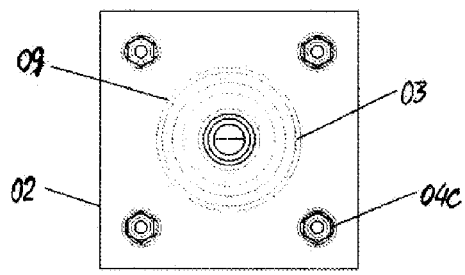
FIG. 4 illustrates a bottom perspective view of FIG. 1.
Figure 5:
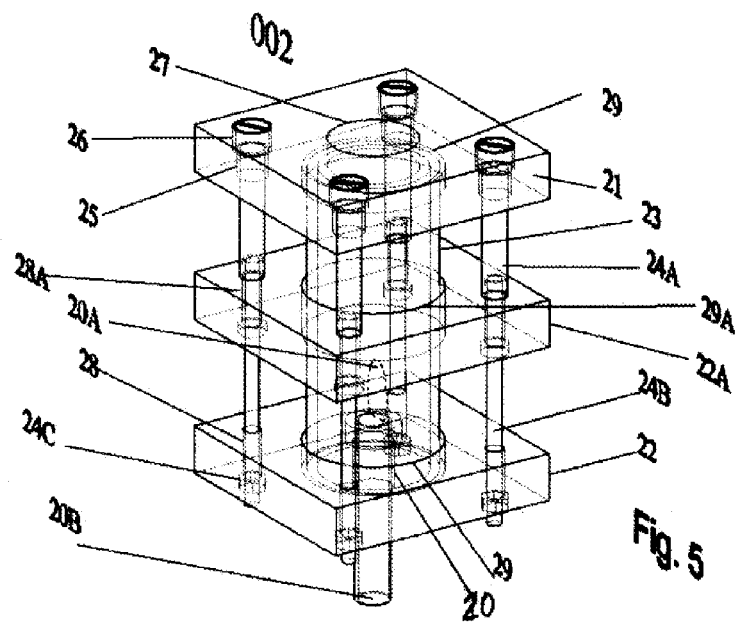
FIG. 5 illustrates a trimetric view for an exemplary polygon lamp device 002.
Figures 7, 8:
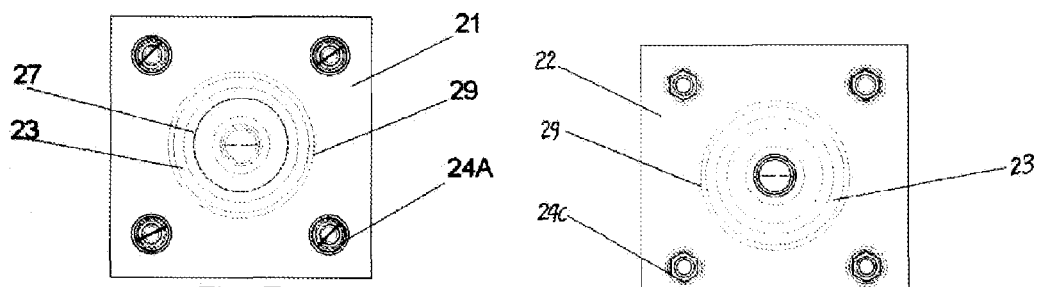
FIG. 7 illustrates a top perspective view for the polygon lamp device of FIG. 5.
FIG. 8 illustrates a bottom perspective view for the polygon lamp device of FIG. 5.
Figure 9:
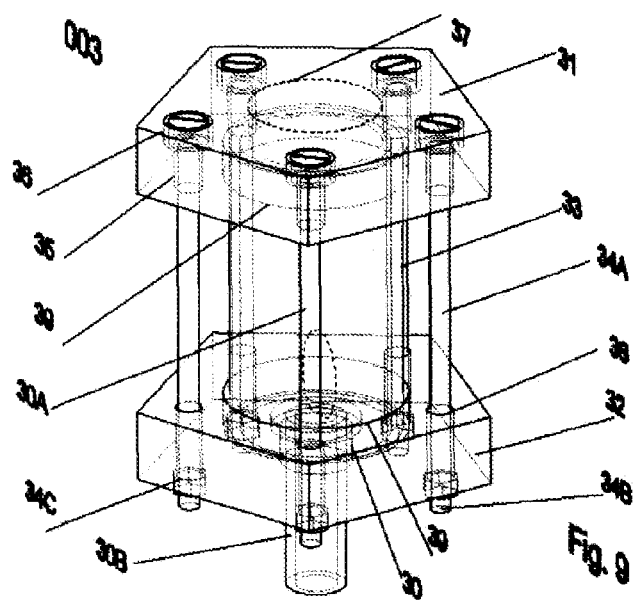
FIG. 9 illustrates a trimetric view for the exemplary polygon lamp device 003.
Figure 10:
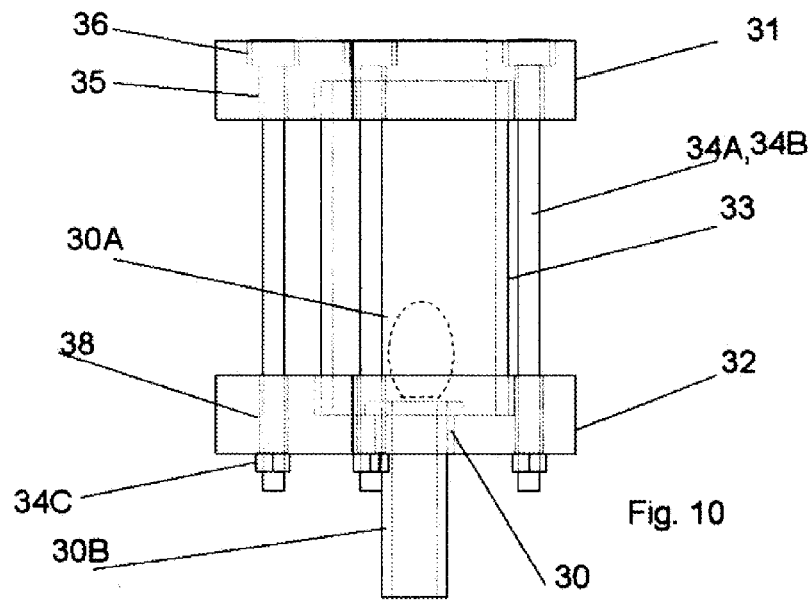
FIG. 10 illustrates a front perspective view for the polygon lamp device of FIG. 9.
Figure 12:
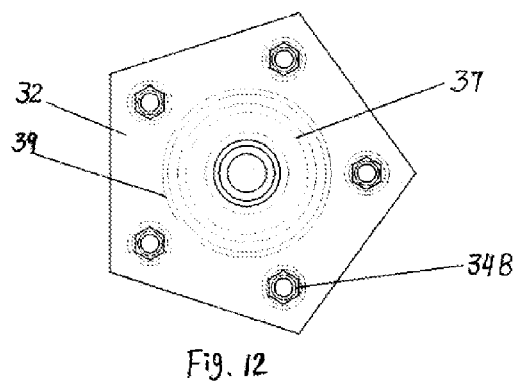
FIG. 12 illustrates a bottom perspective view for the polygon lamp dev of FIG. 9.
Figure 11:
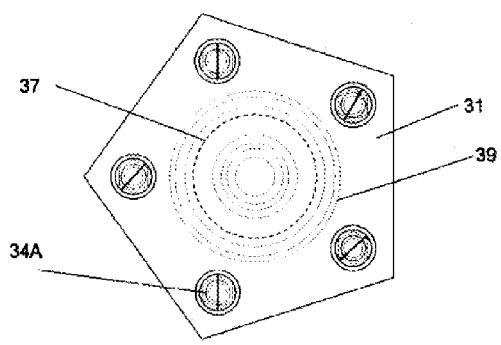
FIG. 11 illustrates a top perspective view for the polygon lamp device of FIG. 9.
Figure 16:
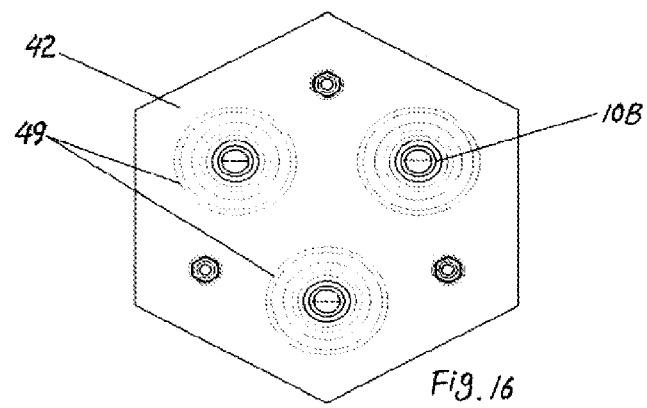
FIG. 16 illustrates a bottom perspective view of FIG. 13.

Referring FIG. 1 through FIG. 16, an embodiment of each exemplary polygon lamp device, 001 of FIG. 1, 001A of FIG. 1A, 002 of FIG. 5, 003 of FIG. 9, 004 of FIG. 13 which selected and comprised of at least the following elements: at least one transparent or translucent tube member, at least one light bulb or light emitting diode/LED for illumination which is connected to at least one supporter or connected to a solar panel and a lighting control system, a plurality of shaft members and at least two spaced-apart polygon board members included configuration of holes.

The at least one transparent or translucent tube member 03 or 23 or 33 or 43 which can be constructed from materials such as glass, plastic or any kind of material that is strong and weather resistant if the lamp device is used outdoor, or if the lamps device is used indoor, the material of the tube also needs to be strong enough for machine processing such as cutting or drilling, etc.

Each exemplary polygon lamp device comprises a plurality of shaft members where each of the shaft members includes at least a head portion including a head at the end of the shaft 04A or 24A or 34A or 44A and a screw portion including screw at the end of the shaft 04B or 24B or 34B or 44B, and a nut 04C or 24C or 34C, or 44C, the head portion 04A or 24A or 34A or 44A and the screw portion 04B or 24B or 34B or 44B of the shaft member which can be fabricated in one part for fixation of two spaced-apart polygon boards of the lamp device.

Each exemplary polygon lamp device comprises at least two spaced-apart polygon boards which include a first polygon board member 01 or 21 or 31 or 41 configured to at least one unthreaded tube hole 09 or 29 or 39 or 49 which can be mounted at one end of the at least one transparent or translucent tube 03 or 23 or 33 or 43 preferably placed in the center or evenly placed around the center of the first polygon board member.

The first polygon board member 01 or 21 or 31 or 41 is configured to include a plurality of locked holes 05 or 25 or 35 or 45 which are placed evenly around edge of the polygon board member for the head portion of the shaft members 04A or 24A or 34A or 44A partially crossing the locked holes 05 or 25 or 35 or 45 but locked out the head ends of the shaft members; the polygon board member 01 or 21 or 31 or 41 is configured with a plurality of merged holes 06 or 26 or 36 or 46 which are placed evenly around the edge of the polygon board member; each of the merged holes is aligned to the same central axis and parallel and corresponding to the locked hole 05 or 25 or 35 or 45 that can fit in the head end of the shaft members 04A or 24A or 34A or 44A.

The first polygon board 01 or 21 or 31 or 41 is configured to at least one light hole 07 or 27 or 37 or 47 that is placed at the same central axis and is parallel and corresponding to the unthreaded tube hole of the first polygon board 01 or 21 or 31 or 41 for replacement or installation of the at least one light bulb or light emitting diode 10A or 20A or 30A, or 40A for illumination.

Figure 2A:
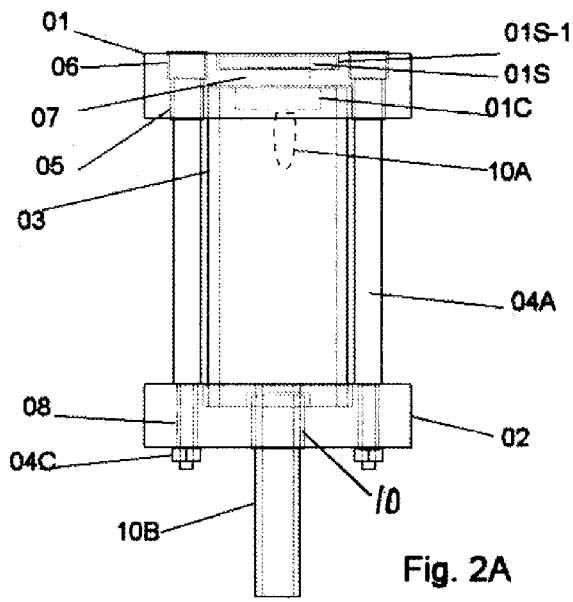
FIG. 2A illustrates a front perspective view of FIG. 1A.

According to the invention, the embodiment of each polygon lamp device can include lighting elements which shown as example in FIG. 1A and FIG. 2A, the solar panel 01S which is connected with a lighting control system 01C and the at least one light bulb or light emitting diode/LED 10A for illumination which are placed or installed at the first polygon board member 01 that is configured to an unthreaded four sided hole 01S-1 that can be fitted into the solar panel; in this case, the at least one light bulb or light emitting diode for illumination 10A will not be connected or installed with the at least one supporter 10B of a second polygon board member 02

According to the invention, each exemplary polygon lamp device 001, or 002 or 003 or 004 comprises at least one second polygon board member that is placed at the same central axis and parallel to the first polygon board member 01 or 21 or 31 or 41 positioned at the opposite end of the at least one transparent or translucent tube member 03 or 23 or 33 or 43 is configured to the same quantity and is parallel and corresponding to an unthreaded tube hole 09 or 29 or 39 or 49 for mounting the opposite end of the at least one transparent or translucent tube 03 or 23 or 33 or 43.

The second board member 02 or 22 or 32 or 42 is configured to a plurality of foot holes 08 or 28 or 38 or 48, each of the foot holes are placed in the same central axis and is parallel and corresponding to the locked hole 05 or 25 or 35 or 45 of the first polygon board member allowing each of the screw end 04B or 24B or 34B or 44B of the shaft members to thread the foot hole 08 or 28 or 38 or 48 so as to fasten with a nut 04C or 24C or 34C or 44C.

The second polygon board member 02 or 22 or 32 or 42 is configured to at least one installation hole 10 or 20 or 30 or 40 to install at least one supporter 10B or 20B or 30B or 40B which can be combined with the at least one light bulb or light emitting diode 10A or 20A or 30A or 40A for illumination that is placed in the same central axis and is parallel to and corresponding to the at least one unthreaded tube hole 09 or 29 or 39 or 49 of the second polygon board.

According to the invention, each of the lamp devices can contain more than two spaced apart polygon board members; referring to the example of the polygon lamp 002 in FIG. 5, this lamp device contains at least three polygon board members. The third polygon board member 22A is placed at the same central axis parallel and positioned between the first and second polygon board members. The third polygon board member 22A is configured to at least one threaded hole 29A that is placed the same quantity and parallel to and corresponding to the unthreaded hole 29 of the first polygon board member 21 or the second polygon board member 22.

The third polygon board member 22A is configured to at least one foot hole 28A that is placed the same quantity and parallel to and corresponding to the foot holes 28 of the second polygon board member 22.

Each shaft member of the head portion 24A including the head end and the foot portion 24B including the screw end can be fabricated in one part to connect two polygon boards members or can be divided into two parts 24A and 24B that can fix the third polygon board member 22A which is positioned between the first and second polygon board members 21 and 22 of the polygon lamp device. Each shaft member (except the nut 24C) can be fabricated to two portions: the head portion 24A, and the foot portion 24B that can be connected with or without a male and a female screw.

Referring FIG. 17 through FIG. 20, FIG. 17A and FIG. 18A, an embodiment of an exemplary polygon-round lamp device selected at least one polygon board member and at least one round board member, the other parts and the configurations of the holes on the polygon board member and the round board member are the same or similar that used and configured in the polygon lamp device, 001 of FIG. 1, 001A of FIG. 1A, 002 of FIG. 5, 003 of FIG. 9, 004 of FIG. 13.

Figure 17:
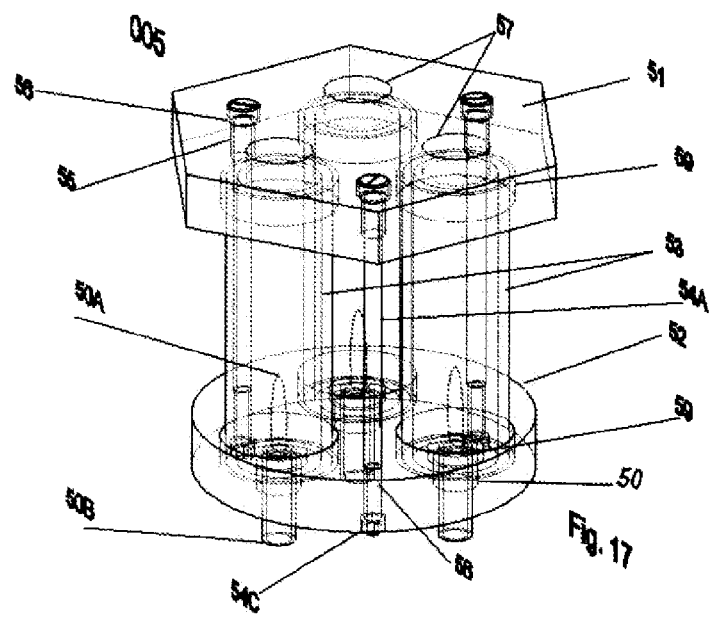
FIG. 17 illustrates a trimetric view for the exemplary polygon-round lamp device 005.
Figure 18:
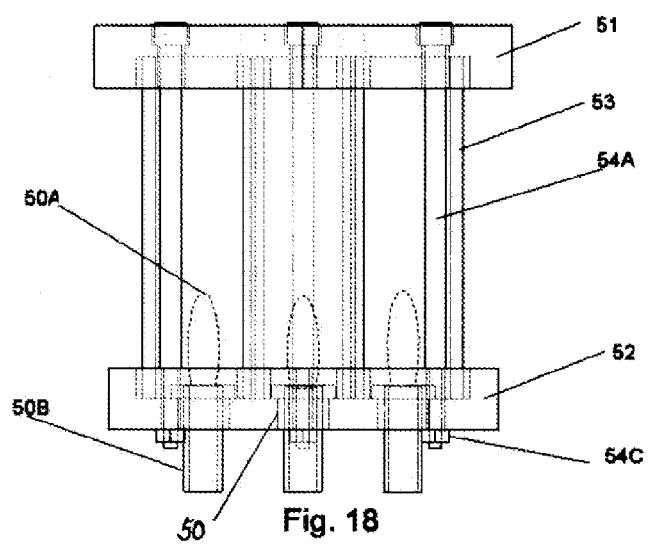
FIG. 18 illustrates a front perspective view of FIG. 17.
Figure 17A:
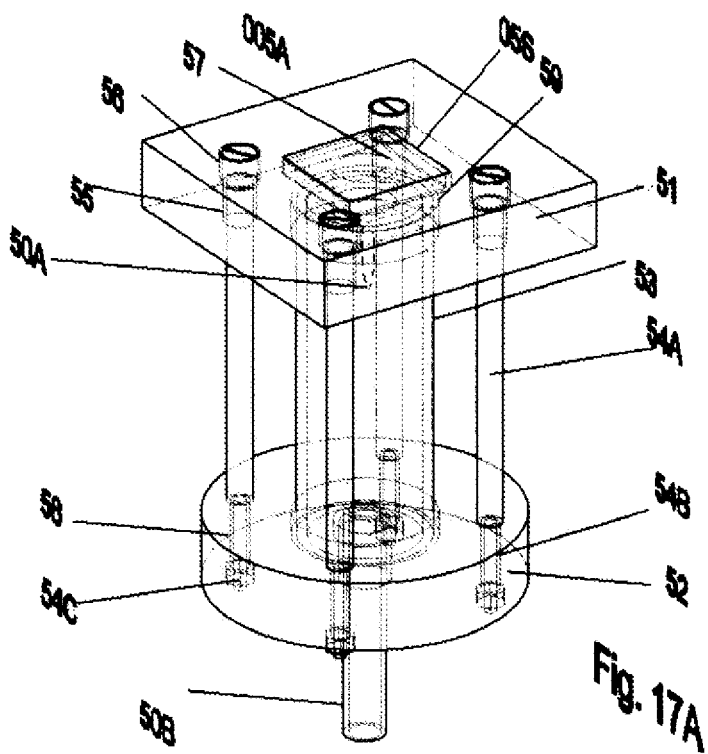
FIG. 17A illustrates a trimetric view for an exemplary polygon-round lamp device 005A included a solar penal and a lighting control system in addition to the polygon-round lamp device 005.

The polygon-round lamp device 005 of FIG. 17 or 005A of FIG. 17A selected at least the following elements which comprises at least one transparent or translucent tube member, at least one light bulb or light emitting diode/LED for illumination which is connected to at least one supporter or connected to a solar panel and a lighting control system, a plurality of shaft members and at least one polygon board member which is spaced apart to at least one round board member included configuration of holes.

The at least one transparent or translucent tube members 53 which can be constructed from materials of a glass, plastic or any kind of material that is strength and weather resistant if the lamp device is used outdoor, even if the lamps device is used indoor the material of the tube still needs strength enough for machine process such as cutting or drilling etc.

The exemplary polygon-round lamp device comprises a plurality of shaft members which each of the shaft members includes a head portion together with a head at end of the shaft MA and a screw portion including a screw at end of the shaft MB and a nut 54C.

According to the invention, the exemplary polygon-round lamp device comprises at least one polygon board member 51 is configured to at least one unthreaded tube hole 59 which can be mounted one end of the at least one transparent or translucent tube 53 preferably placed in the center or evenly placed around the center of the polygon board member.

The polygon board member 51 is configured to include a plurality of locked holes 55 which are placed evenly around edge of the polygon board member for the shaft members 54A and 54B partially crossing the locked holes 55 but locked out the head ends of the shaft members 54A. The polygon board member is configured with a plurality of merged holes 56 which are placed evenly around edge of the polygon board member; each of the merged holes which is placed to the same central axis and is parallel corresponding to the locked hole 55 for fitting in the head end of the shaft members 54A.

The polygon board member 51 further configured at least one light hole 57 which placed at the same central axis and is parallel corresponding to the unthread tube hole 59 of the polygon board member 51 for replacement or installation at least one light bulb or light emitting diode for illumination 50A.

According to the invention, the embodiment of the polygon-round lamp device can include lighting elements which shown as example in FIG. 17A and FIG. 18A, the solar panel 51S which can be connected or combined with a lighting control system 51C and the at least one light bulb or light emitting diode/LED 50A for illumination which are placed or installed at the polygon board member 51 that is configured to an unthreaded four sides hole 51S-1 which can be fitted into the solar panel. In this case, the at least one light bulb or light emitting diode for illumination 50A will not be connected or installed with at least one supporter 50B of a round board member 52.

According to the invention, the exemplary polygon-round lamp device 05 comprises at least one round board member which is placed at the same central axis and parallel to the polygon board member 51 and is positioned at opposite end of the at least one transparent or translucent tube member 53 which is configured the same quantity of unthreaded tube holes 59 for mounting the opposite end of the at least one transparent or translucent tube 53.

The round board member 52 configured a plurality of foot holes 58 that each of the foot holes is placed the same axis center and parallel corresponding to the locked hole 55 of the polygon board member allowed each of the screw end 54B of the shaft members cross the foot hole 58 and fastened with a nut 54C.

The round board member 52 further configured at least one installation hole 50 for installing the supporter 50B that can be combined with the at least one light bulb or light emitting diode for illumination 50A which is placed at the same central axis and parallel corresponding to the at least one unthreaded tube hole 59 of the round board member 52.

The swapped configurations of the holes such as the at least one unthreaded tube hole 59, the locked holes 55, the merged holes 56 and the at least one light hole 57 between the polygon board member 51 and the round board member 52 which have the same efficacy.

Figure 21:
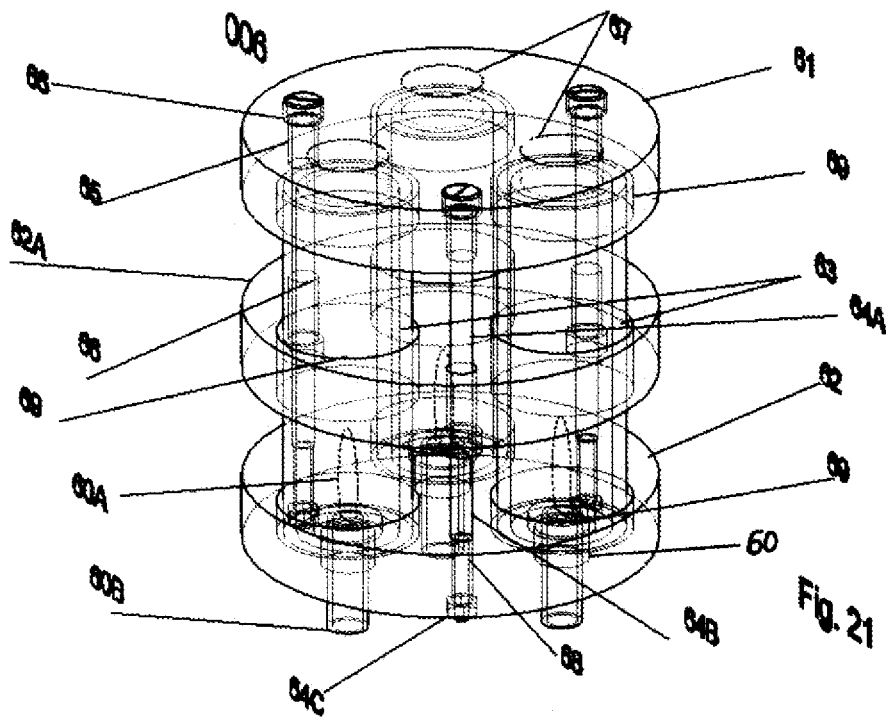
FIG. 21 illustrates a trimetric view for the exemplary round lamp device 006.
Figure 21A:
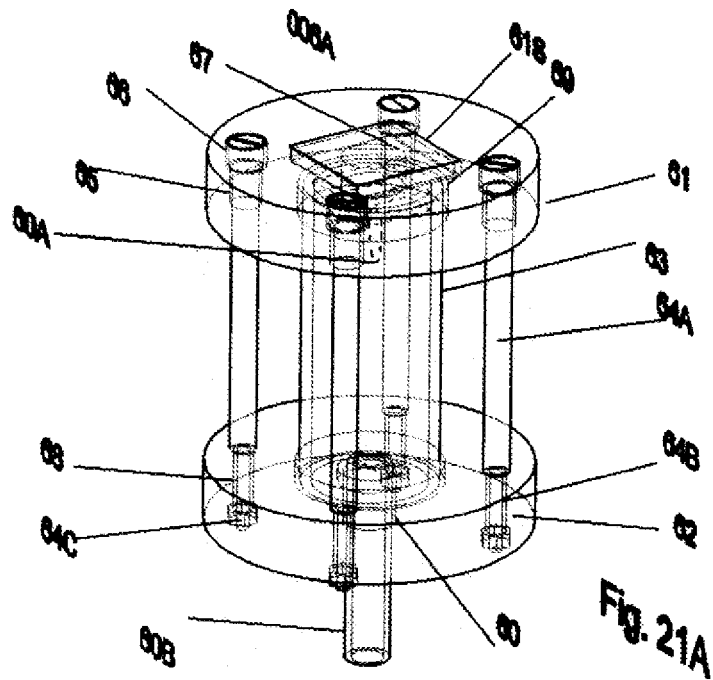
FIG. 21A illustrates a trimetric view for an exemplary round lamp device 006A included a solar penal and a lighting control system in addition to the round lamp device 006.

Referring FIG. 21 through FIG. 24, an embodiment of an exemplary round lamp device, 007 of FIG. 21, 007A of FIG. 21A which selected at least two spaced-apart round board members, the other parts and the configurations of the holes on the two spaced-apart round board members are same or similar which are used or configured in the polygon lamp device 001 of FIG. 1, 001A of FIG. 1A, 002 of FIG. 5, 003 of FIG. 9, or 004 of FIG. 13, or the polygon-round lamp device 005 of FIG. 17 or 005A of FIG. 17A.

The embodiment of an exemplary round lamp device, 007 of FIG. 21 or 007A of FIG. 21A selected at least the following elements, comprising: at least one transparent or translucent tube members, at least one light bulb or light emitting diode/LED for illumination which is connected to at least one supporter or connected to a solar panel and a lighting control system, a plurality of shaft members and at least two spaced-apart round board members including configuration of holes.

The at least one transparent or translucent tube member 63 which can be constructed from materials such as glass, plastic or any kind of material that is strength and weather resistant if the lamp device is used outdoor, or if the lamps device is used indoor, the material of the tube also needs to be strong enough for machine processing such as cutting or drilling, etc.

Each exemplary round lamp device comprises a plurality of shaft members which each of the shaft members includes a head portion including a head at end of the shaft 64A and a screw portion including a screw at end of the shaft 64B and a nut 64C. The head potion 64A and the screw potion 64B of the shaft member which can be fabricated in one part for fixation of two spaced-apart round boards of the lamp device.

According to the invention, the exemplary round lamp device comprises at least two spaced-apart round board members. The first round board member 61 is configured at least one unthreaded tube hole 69 which can be mounted one end of the at least one transparent or translucent tube 63 preferably placed in the center or evenly placed around the center of the first round board member 61.

The first round board member 61 configured a plurality of locked holes 65 which are placed evenly around edge of the round board member for the shaft members 64A partially crossing the locked holes 65 but locked out the head ends of the shaft members 64A, the first round board member 61 is configured a plurality of merged holes 66 which placed evenly around edge of the first round board member, where each of the merged holes is aligned to the same central axis and is parallel corresponding to the locked hole 65 that fits in the head end of the shaft members 64A.

The first round board member 61 further configured to at least one light hole 67 which is placed at the same central axis and is parallel corresponding to the unthreaded tube hole 69 of the first round board member 61 for replacement or installation of the at least one light bulb or light emitting diode for illumination 60A.

Figure 22A:
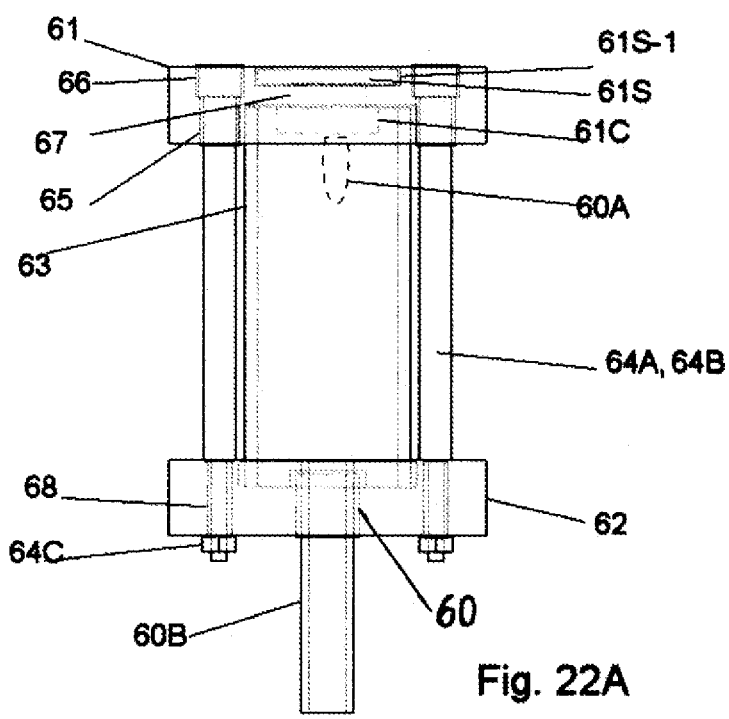
FIG. 22A illustrates a front perspective view of FIG. 21A.
Figure 22:
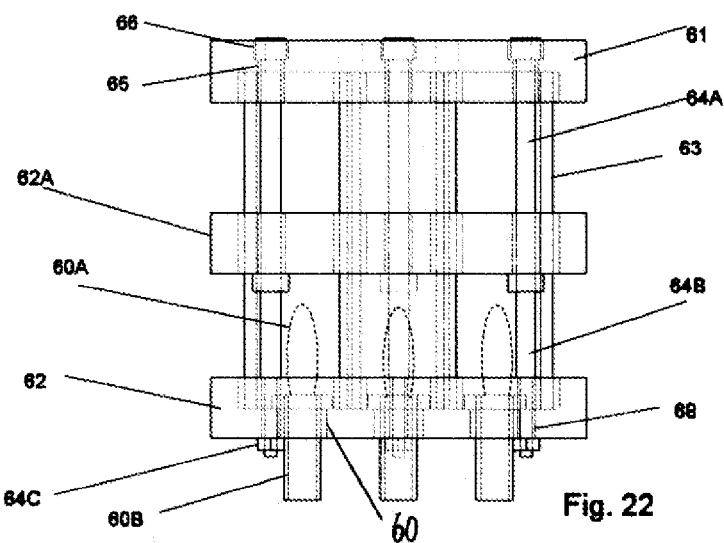
FIG. 22 illustrates a front perspective view of FIG. 21.
Figure 23:
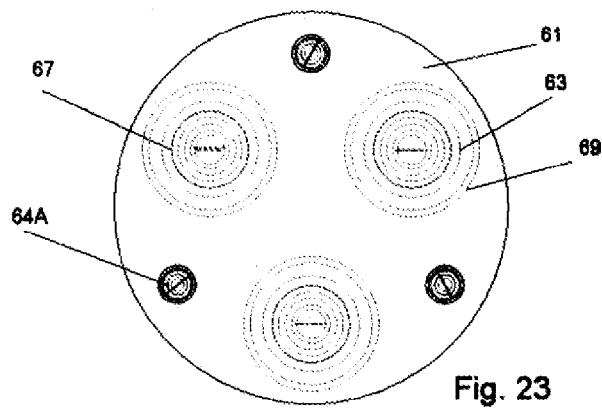
FIG. 23 illustrates a top perspective view of FIG. 21.
Figure 24:
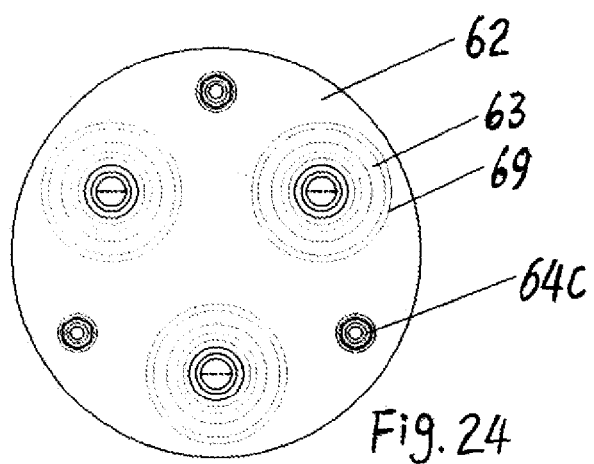
FIG. 24 illustrates a bottom perspective view of FIG. 21.

According to the invention, the embodiment of the round lamp device can include lighting elements which shown as example in FIG. 21A and FIG. 22A, the solar panel 61S which can be connected or combined with a lighting control system 61C and at least one light bulb or light emitting diode/LED 60A for illumination which are placed or installed at the first round board member 61 that is configured to an unthreaded four sided hole 61S-1 which can be fitted into the solar panel. In this case, the at least one light bulb or light emitting diode for illumination 60A will not be connected or installed with at least one supporter 60B of a second round board member 62.

According to the invention, the exemplary round lamp device 006 of FIG. 21 comprises at least one second round board member 62 is placed at the same central axis and parallel and corresponding to the first round board member 61 and positioned at opposite end of the at least one transparent or translucent tube member 63 is configured the same quantity of unthreaded tube holes 69 for mounting the opposite end of the at least one transparent or translucent tube 63.

The second round board member 62 is configured a plurality of foot holes 68 that each of the foot holes is placed the same central axis and parallel and corresponding to the locked hole 65 of the first round board member 61 allowed each of the screw end 64B of the shaft members to thread the foot hole 68 and fastened with a nut 64C.

The second round board member 62 further configured at least one installation hole 60 for installing at least one supporter 60B that can be connected and combined with the at least one light bulb or light emitting diode for illumination 60A that is placed in the same central axis and parallel and corresponding to the at least one unthreaded tube hole 69B of the second round board member 62.

According to the invention, each of the lamp devices can be contained more than two spaced apart round board members, referring example of the round lamp device 006 in FIG. 21, this lamp device contained at least three round board members. The third round board member 62A is configured to at least one threaded hole 69A that is placed the same quantity and parallel corresponding to the unthread hole 69 of first round board member 61 or the second round board member 62.

The third round board member 62A is configured at least one foot hole 68A that is the same quantity and parallel and corresponding to the foot holes 68 of the second round board member 62.

Each shaft member head portion 64A including head at end and foot portion 64B including screw at end can be fabricated in one part to connect the two spaced apart round board members or can be divided to two parts 64A and 64B which can fix the third round board member 62A which is positioned between the first and second round board members 61 and 62 of the round lamp device. Each shaft member (excepted the nut 64C) can be fabricated to two portions: the head portion 64A, and the foot portion 64B that can be connected with or without a male and a female screw.

The dimensions of the exemplary four sides, five sides and six sides of the polygon board and the dimensions of the round board designed depend upon the size of the lamp device's height, width and length depending upon user needs. The size of the exemplary four side, five sides and six sides of the polygon board and the size of the round board design depends upon the size of the lamp device's height, width and length according to user needs.

The embodiment of the polygon lamp devices, the embodiment of the polygon-round lamp device, or the embodiment of the round lamp device satisfies a variety of demands. A user may like a preferred embodiment of one of the exemplary polygon lamp devices, but another user may find that the embodiment of the polygon-round lamp device or the embodiment of the round lamp device satisfies its needs or exceeds its expectations.

The above description with accompanying drawings of different examples in the figures should be construed in an illustrative sense and not limit the scope of the present invention. The appearance of the elements such as the polygon board members or holes configured on the polygon board members or the round board members or the lighting control system etc. in the Figs. of the drawing are for demonstration and description purposes, since the actual appearances of the elements or structure of the lamp devices may differ from the Figs. of the drawings herein. Certain changes may be made in the foregoing disclosure but are not intended to depart from the scope of the invention.

What is claimed is:

1. A polygon lamp device which is selected at least the following elements with configurations of the holes, comprising:
    a). at least one transparent or translucent tube member;
    b). at least one light bulb or light emitting diode for illumination which is connected with at least one supporter, or the at least one light bulb or light emitting diode for illumination which is connected with a solar panel and a lighting control system which is included in the polygon lamp device,
    c). a plurality of shaft members which are each comprised of at least a head portion of the shaft member including a head end, a screw portion of the shaft member including screw end, and a nut; and
    d). at least two spaced-apart polygon board members of which the first polygon board member is configured with at least one unthreaded tube hole preferably placed in the center or evenly placed around the center of the first polygon board member for mounting one end of the at least one transparent or translucent tube,
    wherein the first polygon board member is configured to a plurality of locked holes which are placed evenly around the edge of the first polygon board member for the shaft members partially crossing the locked holes but locked out the head end of the shaft members,
    wherein the first polygon board member is configured with a plurality of merged holes which are placed evenly around the edge of the first polygon board member, where each of the merged holes is placed with the same central axis and parallel and corresponding to the locked hole that fits into the head end of the shaft members,
    wherein the first polygon board member is configured with an unthreaded four sided hole that fits into the solar panel if the solar panel and the lighting control system is included in the polygon lamp device,
    wherein at least two spaced-apart polygon board members comprising a second polygon board member is placed at the same central axis parallel to the first polygon board member and is positioned at the opposite end of the at least one transparent or translucent tube member,
    wherein the second polygon board member is configured to the same quantity and parallel and corresponding to unthreaded tube hole of the first polygon board member for mounting the opposite end of the at least one transparent or translucent tube,
    wherein the second polygon board member is configured to a plurality of foot holes which each of the foot holes is placed in the same central axis which is parallel and corresponding to the locked hole of the first polygon board member which allows each of the screw ends of the shaft members to thread the locked hole which is fastened with a nut,
    wherein the second polygon board member is configured to at least one installation hole which is placed in the same central axis and parallel to and corresponding to the at least one unthreaded tube hole of the second polygon board member for installation of the at least one supporter.

2. The polygon lamp device claim 1, wherein the first polygon board member further configured to at least one light hole which is placed at the same central axis that is parallel to and corresponding to the unthreaded tube holes of the first polygon board member for replacement or installation of the at least one light bulb or light emitting diode for illumination.

3. The polygon lamp device of claim 1, further comprising a third polygon board member which is parallel and positioned between the first polygon board member and the second polygon board member which is configured to at least one threaded tube hole that is placed in the same central axis and parallel to and corresponding to the at least one unthreaded tube hole of the first polygon board member and the second polygon board member,
    wherein the third polygon board is configured to at least one foot hole which is placed in the same central axis and parallel and corresponding to the locked hole of the first polygon board and the foot hole of the second polygon board allowing each of the said foot portion of the shaft members to thread the shaft hole.

4. A polygon-round lamp device which is selected at least the following elements with configurations of the holes, comprising:
    a). at least one transparent or translucent tube member;
    b). at least one light bulb or light emitting diode for illumination which is connected with at least one supporter, or the at least one light bulb or light emitting diode for illumination which is connected with a solar panel and a lighting control system that is included in the polygon lamp device,
    c). a plurality of shaft members which are each comprised of at least a head portion of the shaft member including a head end, a screw portion of the shaft member including screw end, and a nut; and
    d). at least one polygon board member which is configured with at least one unthreaded tube hole preferably placed in the center or evenly placed around the center of the polygon board member for mounting one end of the at least one transparent or translucent tube,
    wherein the polygon board member is configured to a plurality of locked holes which are placed evenly around the edge of the polygon board member for the shaft members partially crossing the locked holes but locked out the head end of the shaft members,
    wherein the polygon board member is configured with a plurality of merged holes which are placed evenly around the edge of the polygon board member, where each of the merged holes is placed with the same central axis and parallel and corresponding to the locked hole that fits into the head end of the shaft members,
    wherein the polygon board member is configured with an unthreaded four sided hole that fits into the solar panel if the solar panel and the lighting control system is included in the polygon-round lamp device,
    wherein the polygon-round lamp device comprising at least one round board member is placed at the same central axis parallel to the polygon board member and is positioned at the opposite end of the at least one transparent or translucent tube member, wherein the round board member is configured to the same quantity and parallel and corresponding to unthreaded tube hole of the polygon board member for mounting the opposite end of the at least one transparent or translucent tube, wherein the round board member is configured to a plurality of foot holes which each of the foot holes is placed in the same central axis which is parallel and corresponding to the locked hole of the polygon board member which allows each of the screw ends of the shaft members to thread the locked hole which is fastened with a nut, wherein the round board member is configured to at least one installation hole which is placed in the same central axis and parallel to and corresponding to the at least one unthreaded tube hole of the round board member for installation of the at least one supporter.

5. The polygon-round lamp device claim 1, wherein the polygon board member further configured to at least one light hole which is placed at the same central axis that is parallel to and corresponding to the unthreaded tube holes of the polygon board member for replacement or installation of the at least one light bulb or light emitting diode for illumination.

6. A round lamp device is selected at least the following elements with configurations of the holes, comprising:
  a). at least one transparent or translucent tube member;
  b). at least one light bulb or light emitting diode for illumination which is connected with at least one supporter, or the at least one light bulb or light emitting diode for illumination which is connected with a solar panel and a lighting control system that is included in the round lamp device,
  c). a plurality of shaft members which are each comprised of at least a head portion of the shaft member including a head end, a screw portion of the shaft member including screw end, and a nut; and
  d). at least two spaced-apart round board members of which the first round board member is configured with at least one unthreaded tube hole preferably placed in the center or evenly placed around the center of the first round board member for mounting one end of the at least one transparent or translucent tube, wherein the first round board member is configured to a plurality of locked holes which are placed evenly around the edge of the first round board member for the shaft members partially crossing the locked holes but locked out the head end of the shaft members, wherein the first round board member is configured with a plurality of merged holes which are placed evenly around the edge of the first round board member, where each of the merged holes is placed with the same central axis and parallel and corresponding to the locked hole that fits into the head end of the shaft members, wherein the first round board member is configured with an unthreaded four sided hole that fits into the solar panel, if the solar panel and the lighting control system is included in the round lamp device, wherein at least two spaced-apart round board members comprising a second round board member is placed at the same central axis parallel to the first round board member and is positioned at the opposite end of the at least one transparent or translucent tube member, wherein the second round board member is configured to the same quantity and parallel and corresponding to unthreaded tube hole of the first round board member for mounting the opposite end of the at least one transparent or translucent tube, wherein the second round board member is configured to a plurality of foot holes which each of the foot holes is placed in the same central axis which is parallel and corresponding to the locked hole of the first round board member which allows each of the screw ends of the shaft members to thread the locked hole which is fastened with a nut, wherein the second round board member is configured to at least one installation hole which is placed in the same central axis and parallel to and corresponding to the at least one unthreaded tube hole of the second round board member for installation of the at least one supporter.

7. The polygon lamp device claim 1, wherein the first round board member further configured to at least one light hole which is placed at the same central axis that is parallel to and corresponding to the unthreaded tube holes of the first round board member for replacement or installation of the at least one light bulb or light emitting diode for illumination.

8. The polygon lamp device of claim 1, further comprising a third round board member which is parallel and positioned between the first round board member and the second round board member which is configured to at least one threaded tube hole that is placed in the same central axis and parallel to and corresponding to the at least one unthreaded tube hole of the first round board member and the second round board member, wherein the third round board member is configured to at least one foot hole which is placed in the same central axis and parallel and corresponding to the locked hole of the first round board member and the foot hole of the second round board member allowing each of the said foot portion of the shaft members to thread the shaft hole.

\* \* \* \* \*